United States Patent
Chu et al.

(10) Patent No.: US 10,088,290 B2
(45) Date of Patent: Oct. 2, 2018

(54) APPARATUS AND METHOD FOR PERFORMING PROXIMITY DETECTION ACCORDING TO CAPACITIVE SENSING OUTPUT AND STATUS OUTPUT

(71) Applicants: Chih-Pin Chu, Hsinchu County (TW); Yu-Han Lin, Pingtung County (TW); Shu-Ching Chen, Tao-Yuan Hsien (TW)

(72) Inventors: Chih-Pin Chu, Hsinchu County (TW); Yu-Han Lin, Pingtung County (TW); Shu-Ching Chen, Tao-Yuan Hsien (TW)

(73) Assignee: MEDIATEK INC., Hsin-Chu (TW)

( * ) Notice: Subject to any disclaimer, the term of this patent is extended or adjusted under 35 U.S.C. 154(b) by 242 days.

(21) Appl. No.: 14/396,739

(22) PCT Filed: Sep. 20, 2012

(86) PCT No.: PCT/CN2012/081655
§ 371 (c)(1),
(2) Date: Oct. 23, 2014

(87) PCT Pub. No.: WO2013/159483
PCT Pub. Date: Oct. 31, 2013

(65) Prior Publication Data
US 2015/0077140 A1 Mar. 19, 2015

Related U.S. Application Data (60) Provisional application No. 61/636,748, filed on Apr. 23, 2012.

(51) Int. Cl.
*G01B 7/14* (2006.01)
*G06F 3/044* (2006.01)
(Continued)

(52) U.S. Cl.
CPC ............ *G01B 7/14* (2013.01); *G06F 3/0346* (2013.01); *G06F 3/044* (2013.01); *G06F 3/0416* (2013.01); *G06F 2203/04108* (2013.01)

(58) Field of Classification Search
CPC ...... G06F 3/044; G06F 3/0416; G06F 3/0346; G06F 3/038; G06F 1/1626; G06F 1/1694;
(Continued)

(56) References Cited

U.S. PATENT DOCUMENTS

2009/0303204 A1* 12/2009 Nasiri ................. A63F 13/06
345/184
2010/0026656 A1* 2/2010 Hotelling ............. G06F 3/044
345/174
(Continued)

FOREIGN PATENT DOCUMENTS

CN 201830328 U 5/2011
CN 102123772 A 7/2011
(Continued)

OTHER PUBLICATIONS

"International Search Report" dated Jan. 31, 2013 for International application No. PCT/CN2012/081655, International filing date: Sep. 20, 2012.

*Primary Examiner* — Jermele M Hollington
*Assistant Examiner* — Brent J Andrews
(74) *Attorney, Agent, or Firm* — Winston Hsu (57) ABSTRACT

A proximity detecting apparatus for detecting a proximity event includes a capacitive sensing device, an auxiliary detecting device, and a controller. The capacitive sensing device is arranged for generating a capacitive sensing output. The auxiliary detecting device is arranged for detecting an operational status of an electronic device in which the capacitive sensing device is disposed and accordingly generating a status output. The controller is arranged for detecting the proximity event according to the capacitive sensing output and the status output.

24 Claims, 9 Drawing Sheets

(51) Int. Cl.
*G06F 3/041* (2006.01)
*G06F 3/0346* (2013.01)

(58) Field of Classification Search
CPC .......... G06F 3/017; G06F 3/03; G06F 3/0485;
G01B 7/14; G01B 7/01; H03K 17/955;
A63F 13/06; A63F 13/428; A63F 13/92;
A63F 13/211; G03B 17/00
See application file for complete search history.

(56) References Cited

U.S. PATENT DOCUMENTS

| | | | |
|---|---|---|---|
| 2010/0039394 A1* | 2/2010 | Moussavi | G06F 3/017 345/173 |
| 2010/0099464 A1* | 4/2010 | Kim | G06F 1/1615 455/566 |
| 2011/0043478 A1 | 2/2011 | Matsushima | |
| 2011/0120784 A1 | 5/2011 | Osoinach | |
| 2012/0214542 A1* | 8/2012 | Sarin | H04M 1/72519 455/550.1 |

FOREIGN PATENT DOCUMENTS

| | | | |
|---|---|---|---|
| CN | 102314269 A | | 1/2012 |
| CN | 102387252 A | | 3/2012 |
| DE | 102010012961 A1 | | 9/2011 |
| JP | 2011061316 A | * | 3/2011 |
| WO | 2011055534 A1 | | 5/2011 |
| WO | W02011055534 A1 | | 5/2011 |

* cited by examiner

APPARATUS AND METHOD FOR PERFORMING PROXIMITY DETECTION ACCORDING TO CAPACITIVE SENSING OUTPUT AND STATUS OUTPUT

CROSS REFERENCE TO RELATED APPLICATIONS

This application claims the benefit of U.S. provisional application No. 61/636,748, filed on Apr. 23, 2012 and incorporated herein by reference.

TECHNICAL FIELD

The disclosed embodiments of the present invention relate to proximity detection, and more particularly, to an apparatus for performing proximity detection according to a capacitive sensing output and a status output and related method thereof.

BACKGROUND

With the development of the mobile phone, more functions are supported by the mobile phone. For example, a touch panel is employed by a smart phone/high-end feature phone to allow a large-sized display screen to act as part of a user interface. In other words, the touch screen can display information and receive the user input. Besides, additional sensors, including a G-sensor, a magnetic field sensor, a light sensor, an orientation sensor, etc., may be employed by the smart phone/high-end feature phone to enhance the user experience.

However, when the user uses the smart phone/high-end feature phone to make an outgoing call or receive an incoming call, the touch screen is generally close to user's face during the call. The smart phone/high-end feature phone may receive an unexpected user input via the touch screen in the proximity of user's face. For example, the smart phone/high-end feature phone may end the call after misjudging that the soft key "End call" is touched by the user. If the size of the touch screen is larger, the probability of the misjudgment is higher. To solve this problem, a proximity sensor is therefore introduced. The conventional proximity sensor can operate in several different ways. One technique involves generating a constant beam of infrared light and measuring the reflection of the light to check for an object in close proximity. Therefore, when the proximity sensor detects that there is an object (e.g., user's face) close to the touch screen, the touch screen is disabled. In this way, the smart phone/high-end feature phone is prevented from receiving a user input via the touch screen when the user is using the smart phone/high-end feature phone to communicate with a contact person. When the call is ended or the proximity sensor detects that the object (e.g., user's face) is far away from the touch screen, the touch screen is enabled again to allow reception of the user input.

The conventional proximity sensor is a hardware element, which increases the production cost of the mobile phone inevitably. Thus, there is a need for an innovative design which is capable of providing the proximity detection function without using any conventional proximity sensor.

SUMMARY

In accordance with exemplary embodiments of the present invention, an apparatus for performing proximity detection according to a capacitive sensing output and a status output and related method thereof are proposed to solve the above-mentioned problems.

According to a first aspect of the present invention, an exemplary proximity detecting apparatus for detecting a proximity event is disclosed. The exemplary proximity detecting apparatus includes a capacitive sensing device, an auxiliary detecting device, and a controller. The capacitive sensing device is arranged for generating a capacitive sensing output. The auxiliary detecting device is arranged for detecting an operational status of an electronic device in which the capacitive sensing device is disposed and accordingly generating a status output. The controller is arranged for detecting the proximity event according to the capacitive sensing output and the status output.

According to a second aspect of the present invention, an exemplary proximity detecting method for detecting a proximity event is disclosed. The exemplary proximity detecting method includes: utilizing a capacitive sensing device for generating a capacitive sensing output; detecting an operational status of an electronic device in which the capacitive sensing device is disposed, and accordingly generating a status output; and detecting the proximity event according to the capacitive sensing output and the status output.

According to a third aspect of the present invention, an exemplary proximity detecting apparatus for detecting a proximity event is disclosed. The exemplary proximity detecting apparatus includes a capacitive sensing device, an auxiliary detecting device, and a controller. The capacitive sensing device is arranged for generating a capacitive sensing output. The auxiliary detecting device is arranged for detecting an operational status of an electronic device in which the capacitive sensing device is disposed and accordingly generating a status output. The controller is arranged for controlling a sensitivity setting of the capacitive sensing device according to the status output, and detecting the proximity event according to at least the capacitive sensing output.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main conception of the present invention is to use one or more hardware elements already available in an electronic device (e.g., a smart phone or a high-end feature phone) to implement the desired proximity detection functionality, thus avoiding the need of a conventional proximity. In this way, the production cost of the electronic device is reduced accordingly. By way of example, a capacitive sensing device (e.g., a touch panel) is used to act as a proximity sensor. Besides, an auxiliary detecting device (e.g., an orientation sensor) may be used to improve the proximity detection accuracy of the capacitive sensing device. Further details are described as below.

Figure 1:
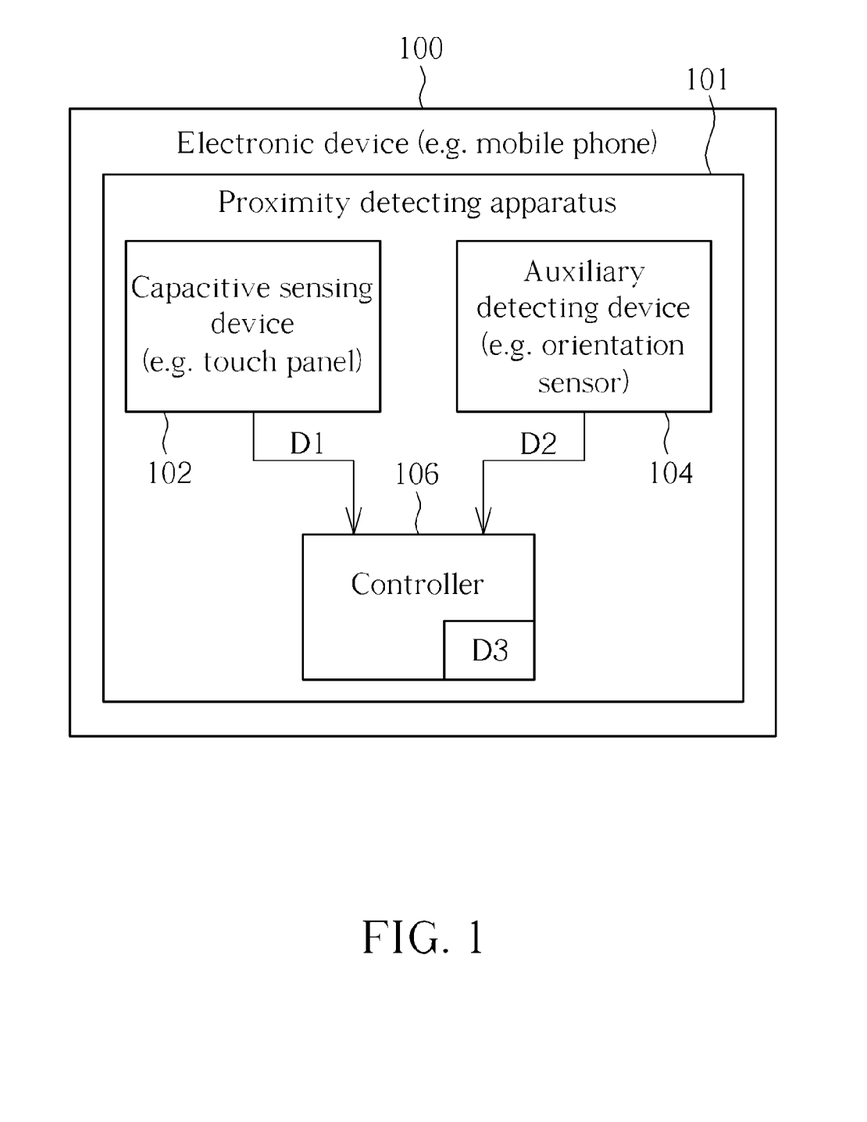
FIG. 1 is a block diagram illustrating a proximity detecting apparatus according to an embodiment of the present invention.

FIG. 1 is a block diagram illustrating a proximity detecting apparatus according to an embodiment of the present invention. The proximity detecting apparatus 101 is disposed in an electronic device 100. For example, the electronic device 100 may be a mobile phone, such as a smart phone or a high-end feature phone. The proximity detecting apparatus 101 includes a capacitive sensing device 102, an auxiliary detecting device 104, and a controller 106. By way of example, the capacitive sensing device 102 may be a capacitive touch panel of the electronic device 100, the auxiliary detecting device 104 may be an orientation sensor or other sensor employed in the electronic device 100, and the controller 106 may be a processor of the electronic device 100. That is, the capacitive sensing device 102, the auxiliary detecting device 104, and the controller 106 are capable of performing a proximity detection function when operating in a proximity detection mode, and are capable of performing a different function when operating in a normal mode.

Regarding the proximity detection, the capacitive sensing device 102 is arranged for generating a capacitive sensing output D1, the auxiliary detecting device 104 is arranged to generate a status output D2, and the controller 106 generates a proximity detection result D3 accordingly. The capacitive sensing device 102 is used to take place of a proximity sensor. Specifically, the capacitive sensing device 102 may be a touch panel, where the touch panel acts as a user interface for receiving a user input when operating in a first mode (e.g., the normal mode), and generates the capacitive sensing output D1 for detecting a proximity event when operating in a second mode (e.g., the proximity detection mode). When the touch panel acts as a user interface, the controller 106 generates driving signals to the touch panel via driving lines, and receives output signals of the touch panel via the sensing lines after an object (e.g., user's finger) has physical contact with the touch panel. Based on the received output signals, the controller 106 checks the accumulated capacitance value of each indium tin oxide (ITO) sensor of the touch panel to thereby identify the capacitance variation, and then determines the coordinate value of the object.

Figure 2:
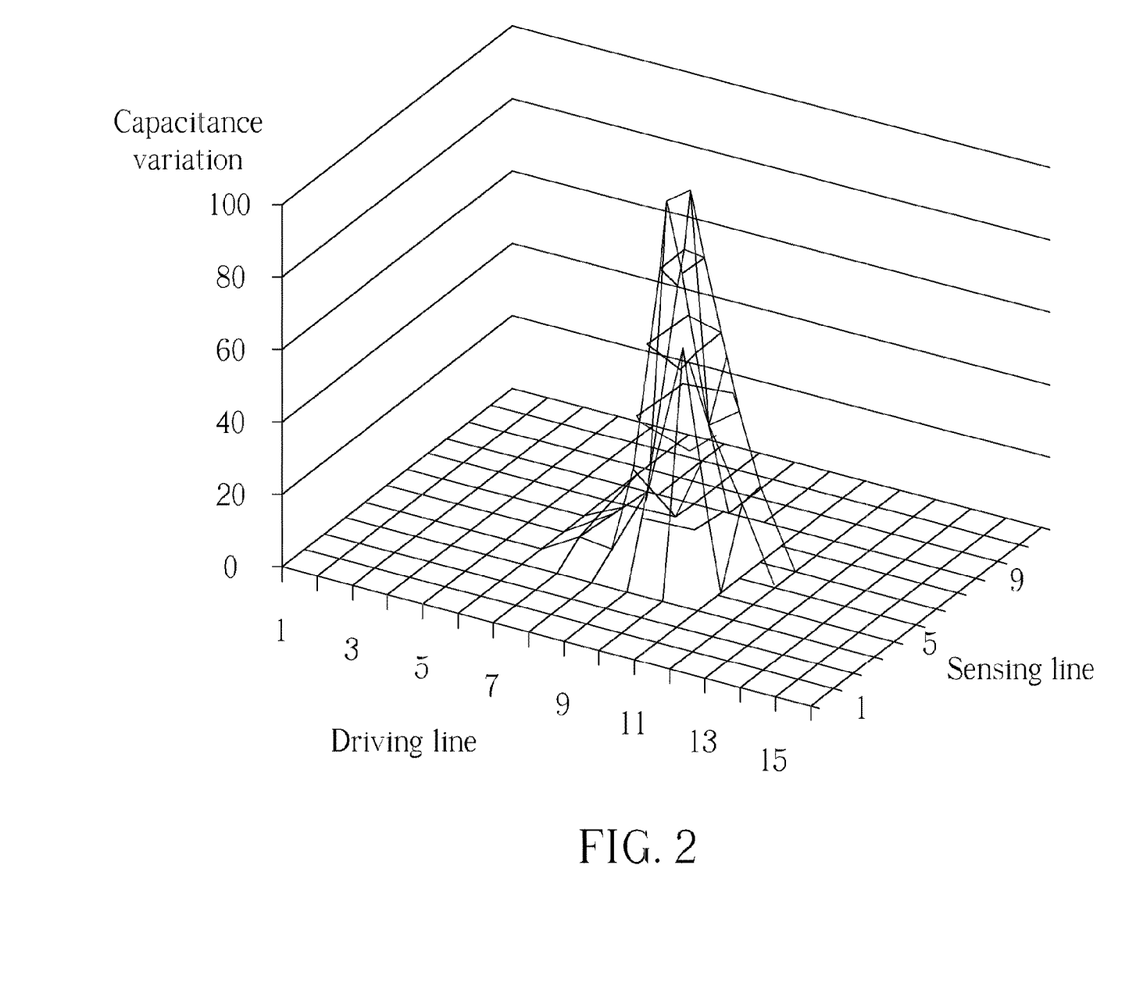
FIG. 2 is a diagram illustrating a capacitance variation distribution of a touch panel when there is an object having physical contact with the touch panel.

FIG. 2 is a diagram illustrating the capacitance variation distribution of the touch panel when there is an object having physical contact with the touch panel. As can be seen from FIG. 2, the capacitance variation distribution has a peak value indicative of the contact position. Hence, after the peak value is identified by a particular algorithm, the coordinate value of the object is determined accordingly.

Figure 3:
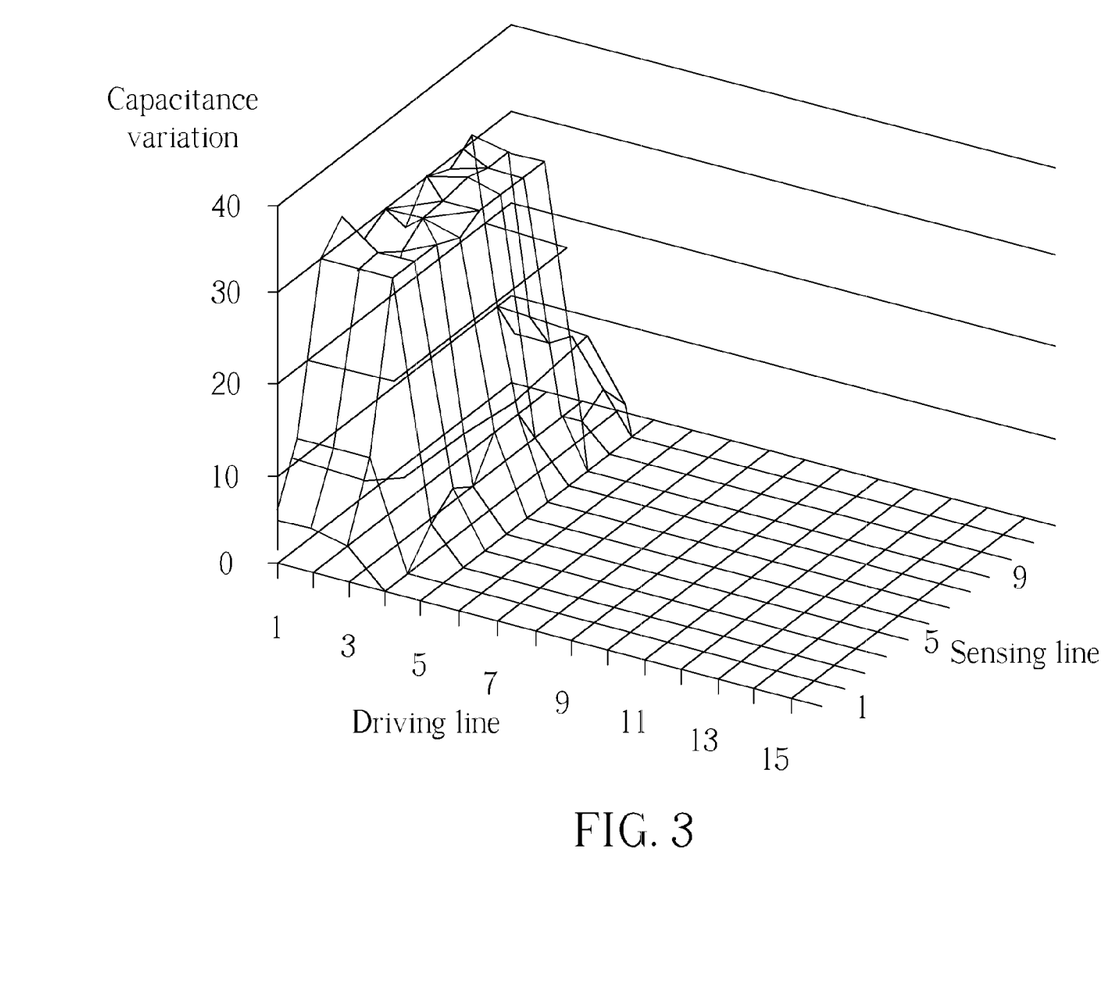
FIG. 3 is a diagram illustrating a capacitance variation distribution of the touch panel when there is an object in the proximity of the touch panel.

However, due to inherent capacitive sensing characteristics, the capacitance variation is induced before the object has physical contact with the touch panel. That is, when an object is approaching the touch panel, a portion of the ITO sensors of the touch panel may have small capacitance variation caused by the object in the proximity of the touch panel. FIG. 3 is a diagram illustrating the capacitance variation distribution of the touch panel when there is an object (e.g., user's face) in the proximity of the touch panel. As the top area of the touch panel is close to user's face when the user is talking on the phone, capacitance variation is detected in the top area of the touch panel.

Compared with the capacitance variation distribution shown in FIG. 2, the capacitance variation distribution shown in FIG. 3 has smaller capacitance values. However, the capacitance variation distribution resulting from an approaching object can still provide information needed for detecting a proximity event (i.e., the approaching object in the proximity of the touch panel). Based on such an observation, the touch panel can be used to take place of a conventional proximity sensor. As the proximity detection is achieved without using any conventional proximity sensor, the production cost of the electronic device can be reduced.

It should be noted that the touch control function of at least a portion (i.e., part or all) of the touch panel is inactive while the touch panel is employed for proximity detection. Therefore, the proximity detection function should be properly disabled when the user wants to use at least the portion of the touch panel to enter the user input. Besides, when user's finger which approaches the touch panel to enter the user input is misjudged as a proximity event, the touch panel may be erroneously controlled to enter the proximity detection mode. Consequently, the user is unable to enter the user input via at least the portion of the touch panel, which results in touch control failure.

To make the capacitive sensing device 102 properly switch between different modes, the present invention proposes referring to the status output D2 generated from the auxiliary detecting device 104. Specifically, the auxiliary detecting device 104 is arranged for detecting an operational status of the electronic device 100 in which the capacitive sensing device 102 is disposed, and accordingly generating the status output D2. As the status output D2 provides auxiliary information which can indicate whether the proximity detection function should be enabled, the controller 106 can more accurately control at least a portion of the capacitive sensing device 102 to act as either a user interface or a proximity sensor. To put it another way, the controller 106 is arranged to detect the proximity event (e.g., user's face approaching the capacitive sensing device 102) according to the capacitive sensing output D1 and the status output D2, and accordingly generate the proximity detection result D3. For example, when the presence of a proximity event is detected, the proximity detection result D3 is set by a first logic value (e.g., "1"), and when presence of a proximity event is not detected, the proximity detection result D3 is set by a second logic value (e.g., "0").

In a case where the auxiliary detecting device 104 is an orientation sensor, the status output D2 includes rotation angle information. Please refer to FIG. 4, which is a diagram illustrating an orientation status of the electronic device 100. When the electronic device 100 is rotated by Y-axis, the status output D2 would include a roll value; when the electronic device 100 is rotated by X-axis, the status output D2 would include a pitch value; and when the electronic device 100 is rotated by Z-axis, the status output D2 would include an azimuth/yaw value.

Figure 4:
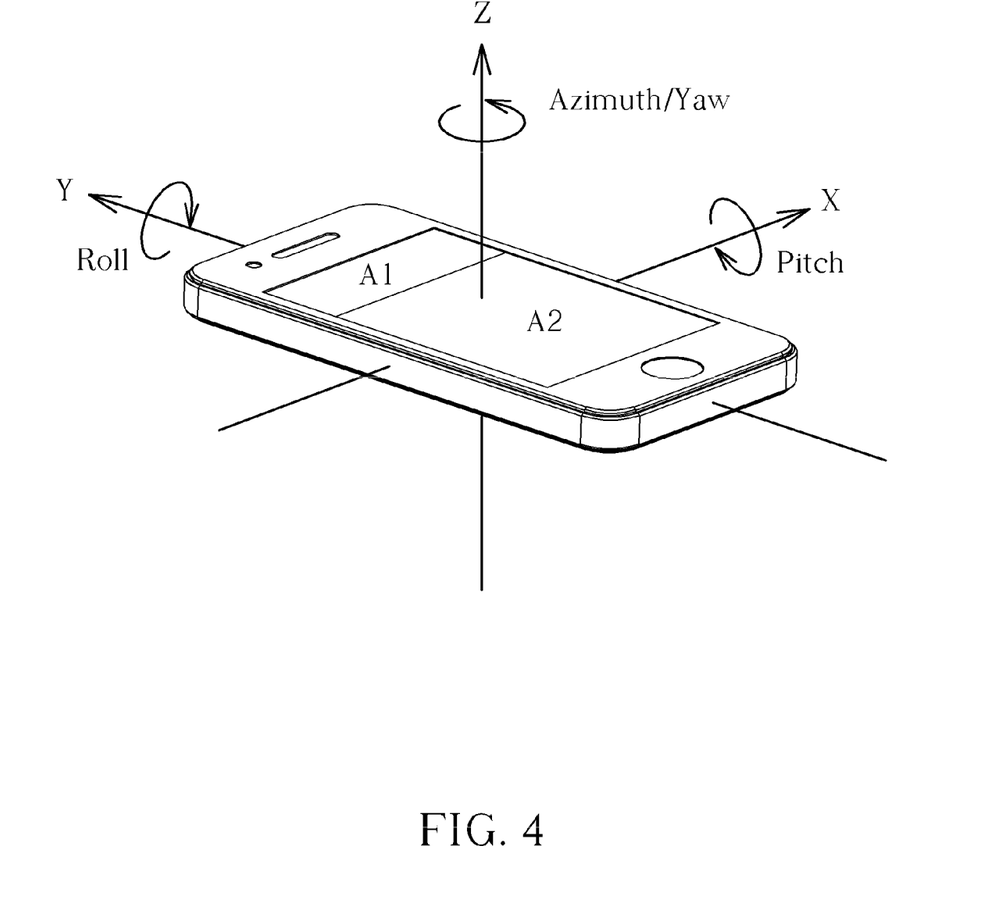
FIG. 4 is a diagram illustrating an orientation status of the electronic device shown in FIG. 1.

It should be noted that the capacitive sensing device 102 shown in FIG. 1 may be divided into a first portion A1 and a second portion A2, as shown in FIG. 4. According to the present invention, the first portion A1 (e.g., a top area of the touch panel) is controlled to switch between a proximity detection function and a touch control function. Regarding the second portion A2 (e.g., a bottom area of the touch panel), it may be controlled to switch between the proximity detection function and the touch control function. Hence, when the capacitive sensing device 102 operates in the normal mode, both of the first portion A1 and the second portion A2 are allowed to receive the user input, and when the capacitive sensing device 102 operates in the proximity detection mode, none of the first portion A1 and the second portion A2 is allowed to receive the user input.

Alternatively, the second portion A2 may keep performing the touch control function regardless of the operational mode of the capacitive sensing device 102. In other words, when the capacitive sensing device 102 operates in the normal mode, both of the first portion A1 and the second portion A2 are allowed to receive the user input, and when the capacitive sensing device 102 operates in the proximity detection mode, the first portion A1 is prevented from receiving any user input, and the second portion A2 is still allowed to receive the user input. If a user input is generated in response to a contact on the second portion A2 when the capacitive sensing device 102 operates in the proximity detection mode, the upper-layer application software will determine whether this user input should be processed or discarded.

If the user is using the capacitive sensing device 102 to input command/data to the electronic device 100, the azimuth/yaw angle and the pitch angle are not fixed, but the roll angle is generally a constant value (~0°). If the user decides to use the electronic device 100 to communicate with a contact person, the roll angle would have a large angle change from the constant value to another value (e.g., ~90°). In one exemplary design, the roll value transmitted by the status output D2 is taken into consideration for determining an accumulated angle value when the proximity detection function is currently inactive. Hence, when the accumulated angle value reaches a predetermined threshold (e.g., ~45°), this indicates that the capacitive sensing device 102 is approaching user's face. Therefore, the proximity detection function of the first portion A1 is enabled such that the capacitive sensing device 102 operates in the proximity detection mode. As a result, the first portion A1 of the capacitive sensing device 102 (e.g., a top area of the touch panel) is prevented from receiving any user input. The controller 106 may start calculating the accumulated angle value since the electronic device 100 receives an incoming call request, or the user enters a user input to make an outgoing call or receive an incoming call.

When the user is using the electronic device 100 to communicate with a contact person, the azimuth/yaw angle and the pitch angle are not fixed, but the roll angle is generally a constant value (~90°). When the user decides to use the capacitive sensing device 102 to enter command/data, the roll angle would have a large angle change from the constant value to another value (e.g., ~0°). In one exemplary design, the roll value transmitted by the status output D2 is taken into consideration for determining an accumulated angle value when the proximity detection function is currently active. Hence, when the accumulated angle value reaches a predetermined threshold (e.g., ~45°), this indicates that the capacitive sensing device 102 is leaving the user's face. Therefore, the proximity detection function is disabled such that the capacitive sensing device 102 operates in the normal mode. Therefore, the user is allowed to freely enter the user input via any of the portions A1 and A2 of the capacitive sensing device 102. The controller 106 may start calculating the accumulated angle value since the proximity event is detected or the communication channel between the electronic device 100 and another electronic device is established.

Figure 5:
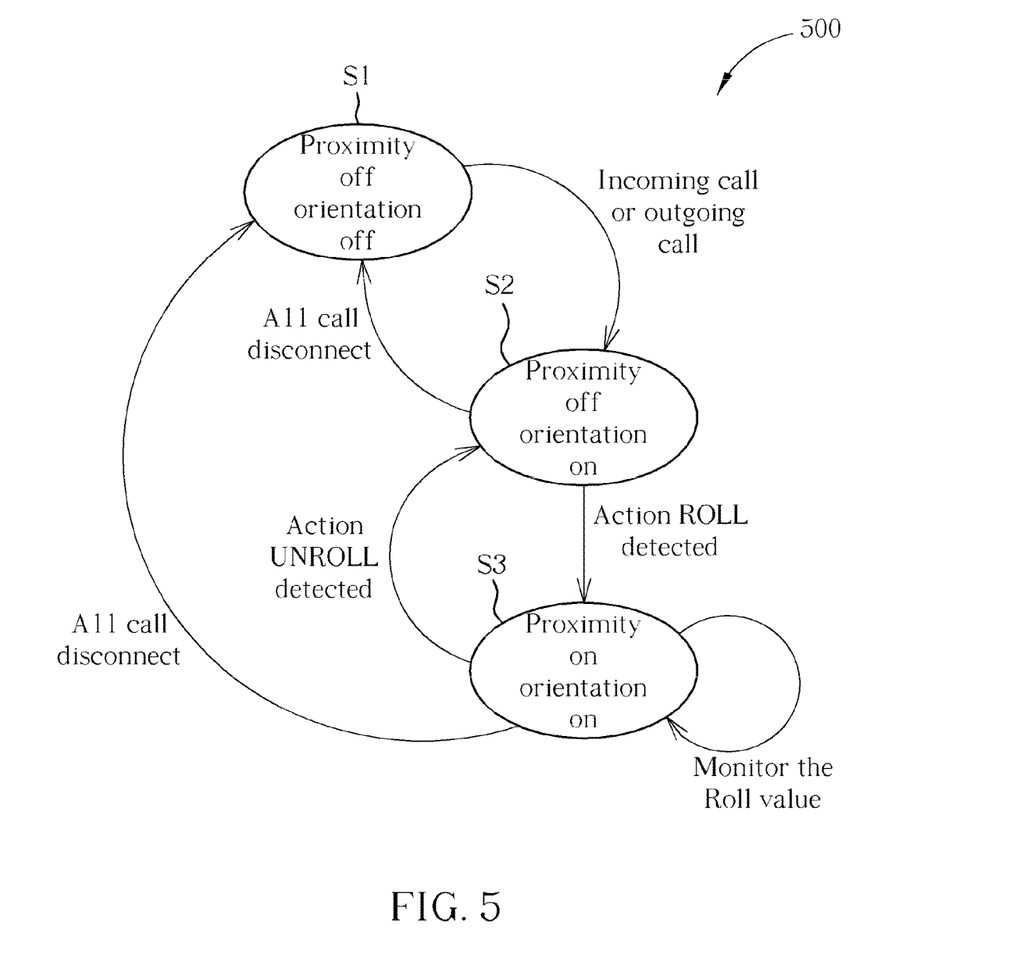
FIG. 5 is a diagram illustrating a state machine of the proximity detecting apparatus shown in FIG. 1 according to an embodiment of the present invention.

FIG. 5 is a diagram illustrating a state machine of the proximity detecting apparatus 101 according to an embodiment of the present invention. The state machine 500 includes a plurality of states S1, S2, and S3. Suppose that the capacitive sensing device 102 is a touch panel, and the auxiliary detecting device 104 is an orientation sensor. Initially, the proximity detecting apparatus 101 enters the first state S1 such that the proximity detection function and the orientation sensing function are both disabled. Specifically, the touch panel is controlled to operate in the normal mode to act as a user interface for receiving the user input, and the orientation sensor is powered off. When there is an incoming call or an outgoing call, the proximity detecting apparatus 101 leaves the first state S1 and enters the second state S2, such that the proximity detection function remains disabled and the orientation sensing function is enabled (e.g., the orientation sensor is powered on).

Based on the rotation angle information (e.g., roll values) transmitted by the status output D2, the controller 106 determines whether a second criterion CR2 is met. That is, the controller 106 analyzes the status output D2 to check if the second criterion CR2 is met, and accordingly generates a second checking result. Specifically, the controller 106 compares an accumulated rotation angle, which is derived from the rotation angle information transmitted by the status output D2, with a predetermined threshold TH2 (e.g., 45°) to check if the second criterion CR2 is met. By way of example, the initial value of the accumulated rotation angle is the instant roll value (e.g., ~0°) at the time the electronic device 100 receives an incoming call request, or the user enters a user input to make an outgoing call or receive an incoming call.

In one exemplary design, when the accumulated rotation angle (e.g., accumulated roll angle) is found larger than the predetermined threshold TH2, the second checking result indicates that the second criterion CR2 is met, and the action "ROLL" for moving the capacitive sensing device 102 towards user's face is thus detected.

After the action "ROLL" is detected, the proximity detecting apparatus 101 leaves the second state S2 and enters the third state S3, such that the proximity detection function is enabled and the orientation sensing function remains enabled. Hence, at least a portion of the touch panel is used for proximity detection now. The controller 106 analyzes the capacitive sensing output D1 (which is generated from at least a portion of the touch panel used for proximity detection) to check if a first criterion CR1 is met, and accordingly generates a first checking result. Specifically, the controller 106 compares an accumulated capacitance variation, which is derived from sampling and accumulating the capacitive sensing output D1, with a predetermined threshold TH1 to check if the first criterion CR1 is met.

In one exemplary design, when the accumulated capacitance variation is found larger than the predetermined threshold TH1, the first checking result indicates that the first criterion CR1 is met, and the proximity event (e.g., user's face in the proximity of the touch panel) is thus detected. Accordingly, the controller 106 sets the proximity detection result D3 to indicate the presence of the proximity event. To put it simply, the controller 106 is arranged to detect the proximity event according to the first checking result and the second checking result.

When the proximity detecting apparatus 101 stays in the third state S3, the controller 106 further determines whether a third criterion CR3 is met based on the rotation angle information (e.g., roll values) transmitted by the status output D2. That is, the controller 106 analyzes the status output D2 to check if the third criterion CR3 is met, and accordingly generates a third checking result. Specifically, the controller 106 compares an accumulated rotation angle, which is derived from the rotation angle information transmitted by the status output D2, with a predetermined threshold TH3 (e.g., TH2=TH3=45°) to check if the third criterion CR3 is met.

By way of example, the initial value of the accumulated rotation angle is the instant roll value (e.g., ~90°) at the time the communication channel is established. In one exemplary design, when the accumulated rotation angle (e.g., accumulated roll angle) is found smaller than the predetermined threshold TH3, the third checking result indicates that the third criterion CR3 is met, and the action "UNROLL" for moving the capacitive sensing device 102 from user's face is thus detected. After the action "UNROLL" is detected, the proximity detecting apparatus 101 leaves the third state S3 and enters the second state S2, such that the proximity detection function is disabled and the orientation sensing function remains enabled. As a result, the touch control function of at least a portion of the touch panel also used for proximity detection is enabled again.

Further, when the proximity detecting apparatus 101 stays in either of the second and third states S2 and S3 and the incoming/outgoing call is disconnected/ended, the proximity detecting apparatus 101 enters the first state S1 such that the proximity detection function and the orientation sensing function are both disabled.

Figure 6:
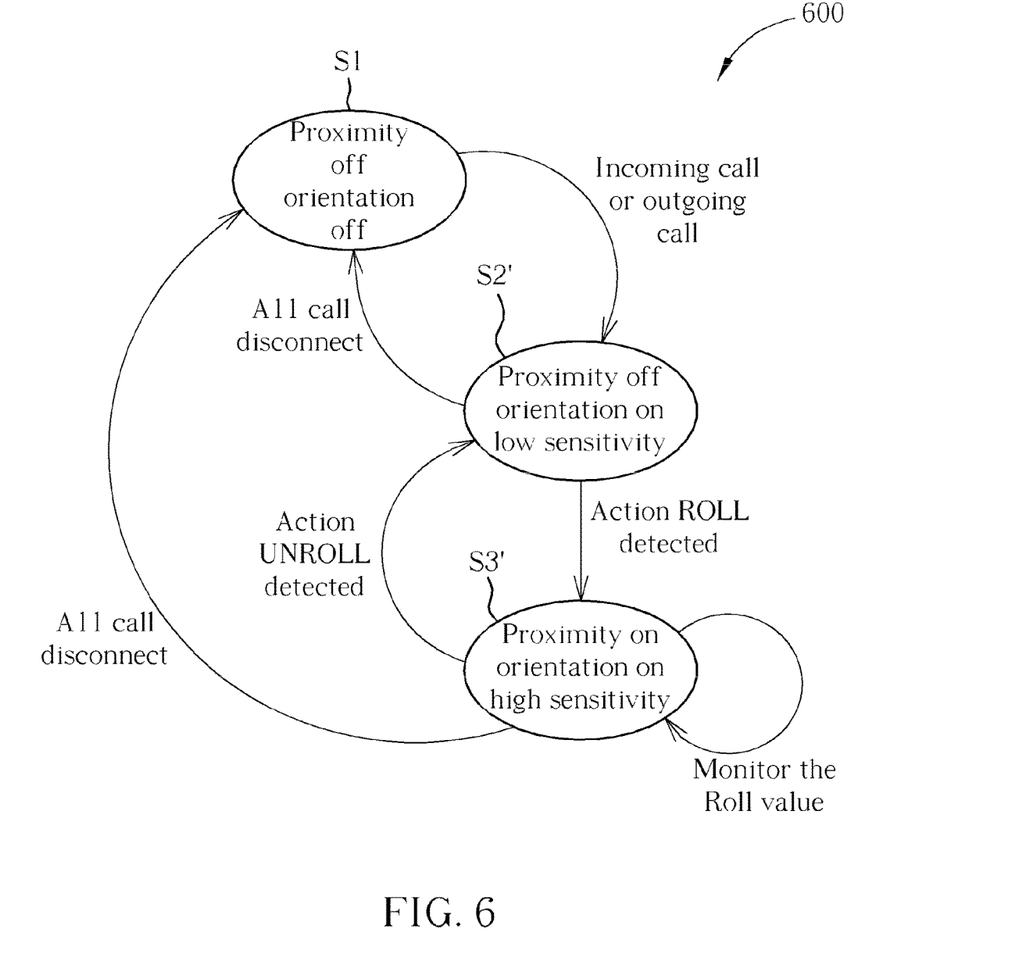
FIG. 6 is a diagram illustrating another state machine of the proximity detecting apparatus shown in FIG. 1 according to an embodiment of the present invention.

As mentioned above, the capacitance variation distribution shown in FIG. 3 has smaller capacitance values when compared with the capacitance variation distribution shown in FIG. 2. To further improve the proximity detection accuracy, the controller 106 may be arranged to dynamically adjust a sensitivity setting of the capacitive sensing device 102 according to the status output D2. Please refer to FIG. 6, which is a diagram illustrating another state machine of the proximity detecting apparatus 101 according to an embodiment of the present invention. The state machine 600 includes a plurality of states S1, S2', and S3'. When the proximity detecting apparatus 101 enters the second state S2', at least a portion of the capacitive sensing device 102 (e.g., the first portion A1 shown in FIG. 4) is controlled to operate in a first sensitivity. When the proximity detecting apparatus 101 enters the third state S3', at least a portion of the capacitive sensing device 102 (e.g., the first portion A1 shown in FIG. 4) is controlled to operate in a second sensitivity higher than the first sensitivity. In other words, when the proximity detection function is enabled, at least a portion of the capacitive sensing device 102 (e.g., the first portion A1 shown in FIG. 4) is controlled to have an enhanced sensitivity.

For example, regarding the capacitive sensing output D1 generated from the first portion A1 shown in FIG. 4, the number of times the controller 106 performs sampling and accumulation upon the capacitive sensing output D1 in one unit time (e.g., one second) is increased. In this way, the capacitance variation distribution obtained under the proximity detection mode would have increased capacitance values, thus facilitating the detection of the proximity event.

Figure 7:
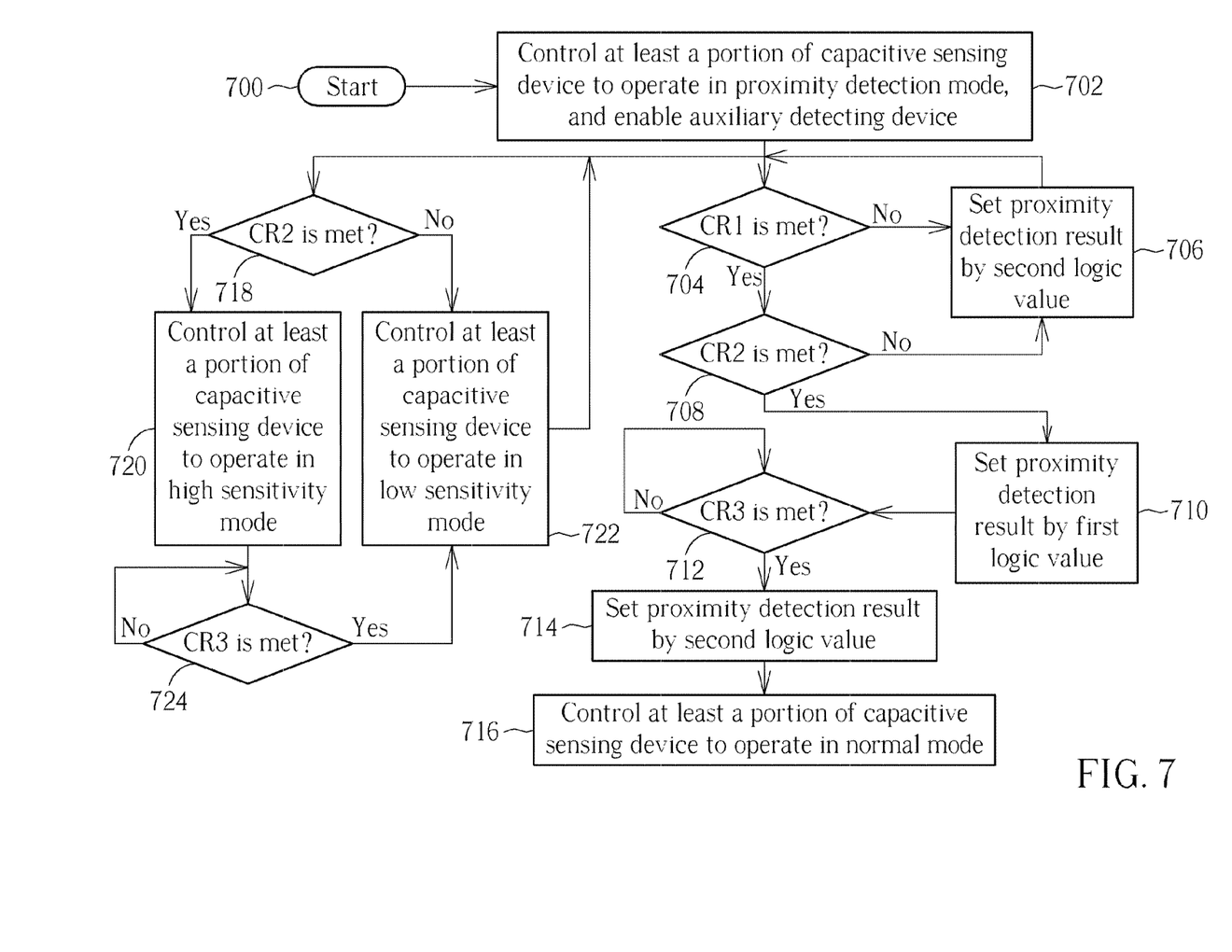
FIG. 7 is a flowchart illustrating a proximity detecting method according to a first embodiment of the present invention.

FIG. 7 is a flowchart illustrating a proximity detecting method according to a first embodiment of the present invention. If the result is substantially the same, the steps are not required to be executed in the exact order shown in FIG. 7. The proximity detecting method may be employed by the proximity detecting apparatus 101 shown in FIG. 1, and may be briefly summarized as below.

Step 700: Start.

Step 702: Control at least a portion of the capacitive sensing device (e.g., a top area of a touch panel) to operate in a proximity detection mode to thereby enable the proximity detection function, and enable the auxiliary detecting device (e.g., an orientation sensor) to generate a status output. The flow proceeds with steps 704 and 718.

Step 704: Detect the occurrence of a proximity event by checking if the criterion CR1 is met. If the criterion CR1 is met, go to step 708; otherwise, go to step 706.

Step 706: Set the proximity detection result D3 by a second logic value (e.g., "0") to report that there is no proximity event detected. Go to step 704 to keep checking the occurrence of a proximity event.

Step 708: Detect the occurrence of the action "ROLL" by checking if the criterion CR2 is met. If the criterion CR2 is met, go to step 710; otherwise, go to step 706.

Step 710: Set the proximity detection result D3 by a first logic value (e.g., "1") to report that there is a proximity event detected.

Step 712: Detect the occurrence of the action "UNROLL" by checking if the criterion CR3 is met. If the criterion CR3 is met, go to step 714; otherwise, perform step 712 again.

Step 714: Set the proximity detection result D3 by the second logic value (e.g., "0") to report that there is no proximity event detected.

Step 716: Control at least a portion of the capacitive sensing device (e.g., a top area of a touch panel) to operate in a normal mode to thereby disable the proximity detection function.

Step 718: Check if the criterion CR2 is met. If the criterion CR2 is met, go to step 720; otherwise, go to step 722.

Step 720: Control at least a portion of the capacitive sensing device 102 (e.g., a top area of a touch panel) to operate in a high sensitivity mode. Go to step 724.

Step 722: Control at least the portion of the capacitive sensing device 102 (e.g., the top area of the touch panel) to operate in a low sensitivity mode. Go to step 718.

Step 724: Check if the criterion CR3 is met. If the criterion CR3 is met, go to step 722; otherwise, perform step 724 again.

Figure 8:
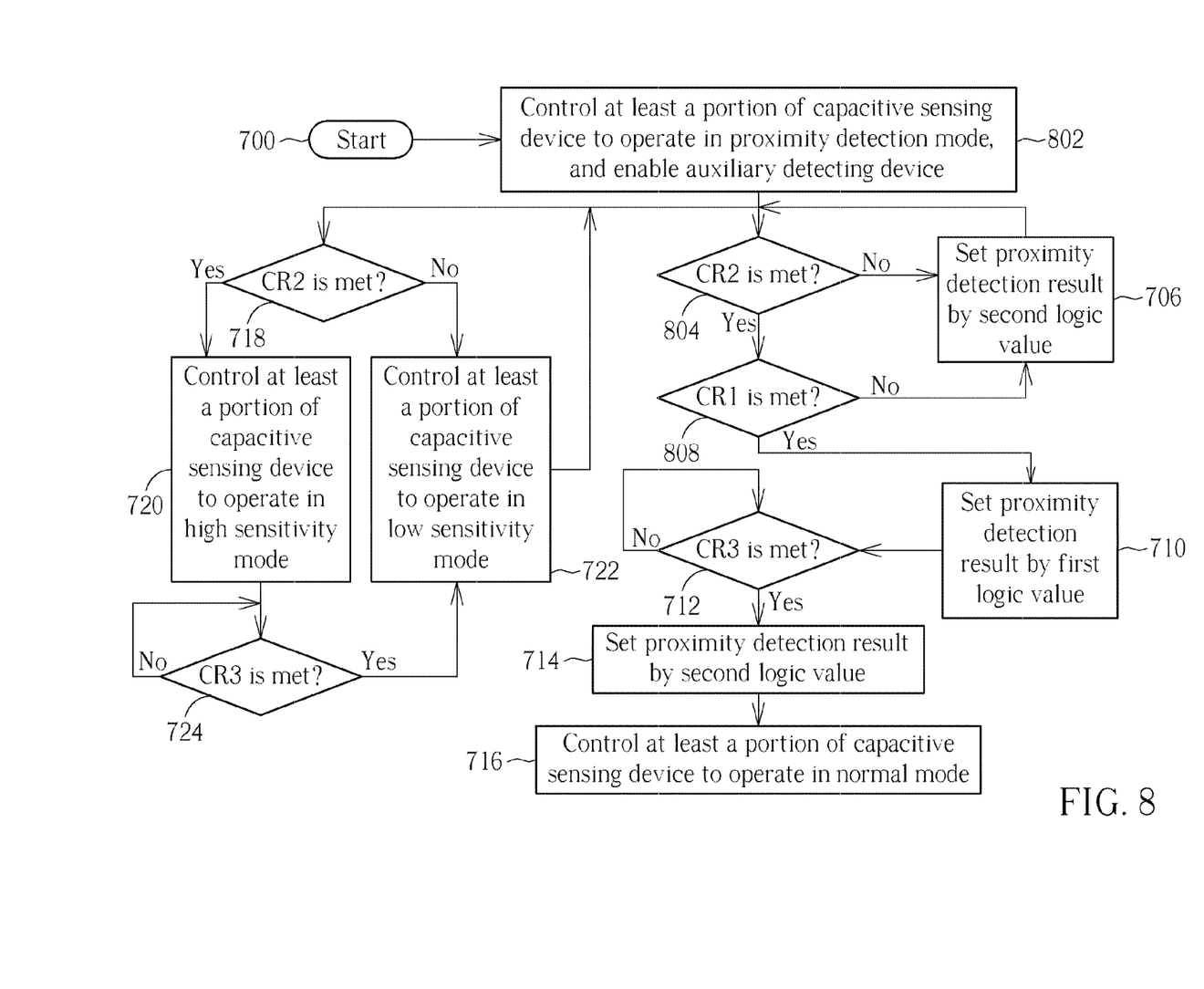
FIG. 8 is a flowchart illustrating a proximity detecting method according to a second embodiment of the present invention.

As shown in FIG. 7, the criterion CR2 is checked after the criterion CR1 is met. However, this is for illustrative purposes only, and is not meant to be a limitation of the present invention. In an alternative design, the flow shown in FIG. 7 may be modified to have the criterion CR1 checked after the criterion CR2 is met. Please refer to FIG. 8, which is a flowchart illustrating a proximity detecting method according to a second embodiment of the present invention. The major difference between the flowcharts shown in FIG. 7 and FIG. 8 is the steps 802, 804 and 806 as below.

Step 802: Control at least a portion of the capacitive sensing device (e.g., a top area of a touch panel) to operate in a proximity detection mode to thereby enable the proximity detection function, and enable the auxiliary detecting device (e.g., an orientation sensor) to generate a status output. The flow proceeds with steps 804 and 718.

Step 804: Detect the occurrence of the action "ROLL" by checking if the criterion CR2 is met. If the criterion CR2 is met, go to step 808; otherwise, go to step 706.

Step 808: Detect the occurrence of a proximity event by checking if the criterion CR1 is met. If the criterion CR1 is met, go to step 710; otherwise, go to step 706.

As a person skilled in the art can readily understand details of each step shown in FIG. 7 and FIG. 8 after reading above paragraphs, further description is omitted here for brevity.

It should be noted that the technical feature of dynamically adjusting the sensitivity setting of the capacitive sensing device 102 according to the status output D2 is not limited to collaborating with the other technical feature of checking the accumulated rotation angle to selectively enable or disable the proximity detection function of the capacitive sensing device 102. That is, any capacitive sensing device used to act as a proximity sensor and equipped with a sensitivity setting adaptively adjusted in response to an accumulated rotation angle falls within the scope of the present invention. For example, regarding an alternative design of the proximity detecting apparatus 101 shown in FIG. 1, it is arranged to have the capacitive sensing device 102 arranged for generating a capacitive sensing output D1, the auxiliary detecting device 104 arranged for detecting an operational status of the electronic device 100 in which the capacitive sensing device 102 is disposed and accordingly generating a status output D2, and the controller 106 arranged for controlling a sensitivity setting of the capacitive sensing device 102 according to the status output D2, and detecting the proximity event according to at least the capacitive sensing output D1.

Figure 9:
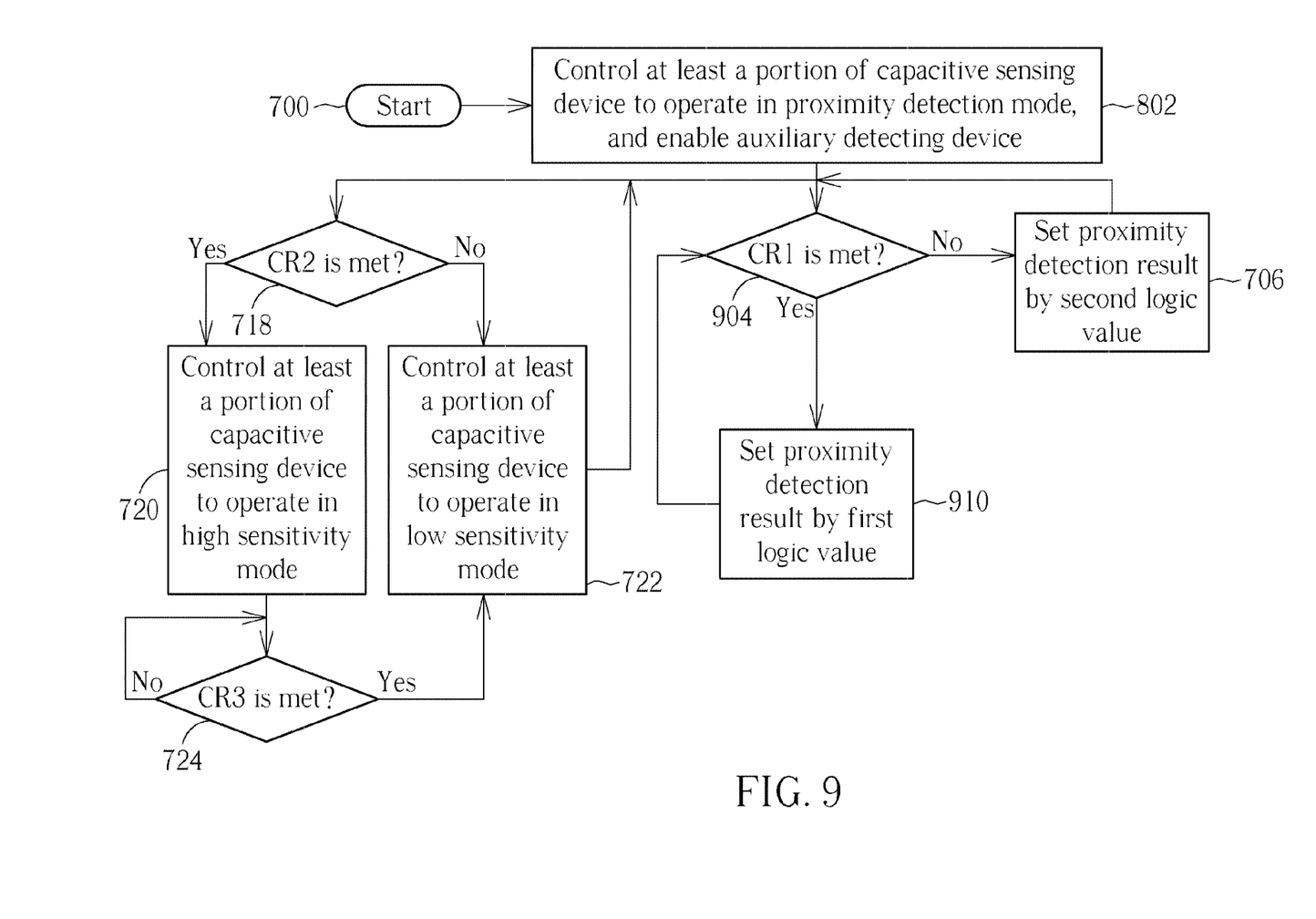
FIG. 9 is a flowchart illustrating a proximity detecting method according to a third embodiment of the present invention.

FIG. 9 is a flowchart illustrating a proximity detecting method according to a third embodiment of the present invention. The major difference between the flowcharts shown in FIG. 7 and FIG. 9 is steps 904 and 910 and omission of steps 708 and 712-716. Steps 904 and 910 are as below.

Step 904: Detect the presence of a proximity event by checking if the criterion CR1 is met. If the criterion CR1 is met, go to step 910; otherwise, go to step 706.

Step 910: Set the proximity detection result D3 by a first logic value (e.g., "1") to report that there is a proximity event detected. Go to step 904 to keep checking the presence of a proximity event.

As a person skilled in the art can readily understand details of each step shown in FIG. 9 after reading above paragraphs, further description is omitted here for brevity.

Those skilled in the art will readily observe that numerous modifications and alterations of the device and method may be made while retaining the teachings of the invention.

Accordingly, the above disclosure should be construed as limited only by the metes and bounds of the appended claims.

The invention claimed is:

1. A proximity detecting apparatus for detecting a proximity event, comprising:
    a capacitive sensing device, arranged for generating a capacitive sensing output;
    an auxiliary detecting device, arranged for detecting an operational status of an electronic device in which the capacitive sensing device is disposed and accordingly generating a status output; and
    a controller, arranged for detecting the proximity event according to the capacitive sensing output and the status output;
    wherein the operational status comprises a rotation status of the electronic device, and the controller checks the status output to determine whether the capacitive sensing device operates in a first mode or operates in a second mode;
    wherein when the capacitive sensing device operates in the first mode, the controller derives first capacitance variation from the capacitive sensing output of the capacitive sensing device, and determines a coordinate value of a contact position by analyzing the first capacitance variation;
    wherein when the same capacitive sensing device operates in the second mode, the controller derives second capacitance variation from the capacitive sensing output of the capacitive sensing device, and detects presence of the proximity event by analyzing the second capacitance variation.

2. The proximity detecting apparatus of claim 1, wherein the capacitive sensing device is a capacitive touch panel, and the auxiliary detecting device is an orientation sensor.

3. The proximity detecting apparatus of claim 1, wherein the controller analyzes the capacitive sensing output to check if a first criterion is met and accordingly generates a first checking result, analyzes the status output to check if a second criterion is met and accordingly generates a second checking result, and detects the proximity event according to the first checking result and the second checking result;
    wherein the first criterion is defined by information derived from the capacitive sensing output and a first predetermined threshold, and the second criterion is defined by information derived from the status output and a second predetermined threshold.

4. The proximity detecting apparatus of claim 3, wherein the status output includes rotation angle information, and the controller compares an accumulated rotation angle with the second predetermined threshold to check if the second criterion is met.

5. The proximity detecting apparatus of claim 1, wherein the controller further controls a sensitivity setting of the capacitive sensing device according to the status output.

6. The proximity detecting apparatus of claim 5, wherein the status output includes rotation angle information; and the controller compares an accumulated rotation angle with a predetermined threshold to obtain a comparing result, and controls the sensitivity setting of the capacitive sensing device according to the comparing result.

7. The proximity detecting apparatus of claim 6, wherein when the comparing result indicates that the accumulated rotation angle does not reach the predetermined threshold yet, at least a portion of the capacitive sensing device operates in a first sensitivity; and when the comparing result indicates that the accumulated rotation angle reaches the predetermined threshold, at least the portion of the capacitive sensing device operates in a second sensitivity higher than the first sensitivity.

8. The proximity detecting apparatus of claim 1, wherein at least a portion of the capacitive sensing device acts as a user interface for receiving a user input when operating in a first mode, and generates the capacitive sensing output referenced for detecting the proximity event when operating in a second mode.

9. The proximity detecting apparatus of claim 8, wherein after detecting the proximity event, the controller analyzes the status output to check if a criterion is met and accordingly generates a checking result, and refers to the checking result to control at least the portion of the capacitive sensing device to switch from the second mode to the first mode;
wherein the criterion is defined by information derived from the status output and a predetermined threshold.

10. The proximity detecting apparatus of claim 9, wherein the status output includes rotation angle information, and the controller compares an accumulated rotation angle with the predetermined threshold to check if the criterion is met.

11. A proximity detecting method for detecting a proximity event, comprising:
utilizing a capacitive sensing device for generating a capacitive sensing output;
detecting an operational status of an electronic device in which the capacitive sensing device is disposed, and accordingly generating a status output; and
detecting the proximity event according to the capacitive sensing output and the status output;
wherein the operational status comprises a rotation status of the electronic device, the status output is checked to determine whether the capacitive sensing device operates in a first mode or operates in a second mode;
wherein when the capacitive sensing device operates in the first mode, first capacitance variation is derived from the capacitive sensing output of the capacitive sensing device, and a coordinate value of a contact position is determined by analyzing the first capacitance variation;
wherein when the same capacitive sensing device operates in the second mode, second capacitance variation is derived from the capacitive sensing output of the capacitive sensing device, and presence of the proximity event is detected by analyzing the second capacitance variation.

12. The proximity detecting method of claim 11, wherein the capacitive sensing device is a capacitive touch panel, and the operational status is an orientation status.

13. The proximity detecting method of claim 11, wherein the step of detecting the proximity event comprises:
analyzing the capacitive sensing output to check if a first criterion is met and accordingly generating a first checking result;
analyzing the status output to check if a second criterion is met and accordingly generating a second checking result; and
detecting the proximity event according to the first checking result and the second checking result;
wherein the first criterion is defined by information derived from the capacitive sensing output and a first predetermined threshold, and the second criterion is defined by information derived from the status output and a second predetermined threshold.

14. The proximity detecting method of claim 13, wherein the status output includes rotation angle information, and the step of analyzing the status output to check if the second criterion is met comprises:
comparing an accumulated rotation angle with the second predetermined threshold to check if the second criterion is met.

15. The proximity detecting method of claim 11, further comprising:
controlling a sensitivity setting of the capacitive sensing device according to the status output.

16. The proximity detecting method of claim 15, wherein the status output includes rotation angle information; and the step of controlling the sensitivity setting of the capacitive sensing device comprises:
comparing an accumulated rotation angle with a predetermined threshold to obtain a comparing result; and
controlling the sensitivity setting of the capacitive sensing device according to the comparing result.

17. The proximity detecting method of claim 16, wherein the step of controlling the sensitivity setting of the capacitive sensing device according to the comparing result comprises:
when the comparing result indicates that the accumulated rotation angle does not reach the predetermined threshold yet, controlling at least a portion of the capacitive sensing device to operate in a first sensitivity; and
when the comparing result indicates that the accumulated rotation angle reaches the predetermined threshold, controlling at least the portion of the capacitive sensing device to operate in a second sensitivity higher than the first sensitivity.

18. The proximity detecting method of claim 11, wherein at least a portion of the capacitive sensing device acts as a user interface for receiving a user input when operating in a first mode, and generates the capacitive sensing output referenced for detecting the proximity event when operating in a second mode.

19. The proximity detecting method of claim 18, further comprising:
after detecting the proximity event, analyzing the status output to check if a criterion is met and accordingly generating a checking result, and referring to the checking result to control at least the portion of the capacitive sensing device to switch from the second mode to the first mode;
wherein the criterion is defined by information derived from the status output and a predetermined threshold.

20. The proximity detecting method of claim 19, wherein the status output includes rotation angle information, and the step of analyzing the status output to check if the criterion is met comprises:
comparing an accumulated rotation angle with the predetermined threshold to check if the criterion is met.

21. A proximity detecting apparatus for detecting a proximity event, comprising:
a capacitive sensing device, arranged for generating a capacitive sensing output;
an auxiliary detecting device, arranged for detecting an operational status of an electronic device in which the capacitive sensing device is disposed and accordingly generating a status output; and
a controller, arranged for controlling a sensitivity setting of the capacitive sensing device according to the status output, and detecting the proximity event according to at least the capacitive sensing output;
wherein the operational status comprises a rotation status of the electronic device;

and the sensitivity setting of the capacitive sensing device comprises a number of times sampling and accumulation is performed upon the capacitive sensing output in one unit time.

22. The proximity detecting apparatus of claim 21, wherein the capacitive sensing device is a capacitive touch panel, and the auxiliary detecting device is an orientation sensor.

23. The proximity detecting apparatus of claim 21, wherein the status output includes rotation angle information; and the controller compares an accumulated rotation angle with a predetermined threshold to obtain a comparing result, and controls the sensitivity setting of the capacitive sensing device according to the comparing result.

24. The proximity detecting apparatus of claim 23, wherein when the comparing result indicates that the accumulated rotation angle does not reach the predetermined threshold yet, the capacitive sensing device operates in a first sensitivity; and when the comparing result indicates that the accumulated rotation angle reaches the predetermined threshold, the capacitive sensing device operates in a second sensitivity higher than the first sensitivity.

* * * * *